(12) United States Patent
Girardin et al.

(10) Patent No.: US 6,338,576 B1
(45) Date of Patent: Jan. 15, 2002

(54) INSTRUMENTED ROLLING BEARING

(75) Inventors: Carole Girardin, Joue-les-Tours; Olivier Message, Tours, both of (FR)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/522,947

(22) Filed: Mar. 10, 2000

(30) Foreign Application Priority Data

Mar. 17, 1999 (FR) .............................................. 99 03336

(51) Int. Cl.[7] .................................................. F16C 32/00
(52) U.S. Cl. ................................... 384/448; 324/207.25
(58) Field of Search ................................. 384/517, 563, 384/448; 310/168; 324/207.25

(56) References Cited

U.S. PATENT DOCUMENTS

| | | | | |
|---|---|---|---|---|
| 3,214,224 A | * | 10/1965 | Lash | 384/517 |
| 4,657,412 A | * | 4/1987 | McLarty et al. | 384/517 X |
| 4,884,901 A | * | 12/1989 | Harsdorff | 384/448 |
| 4,915,512 A | | 4/1990 | Hilby et al. | 384/446 |
| 4,988,219 A | * | 1/1991 | Peilloud | 384/448 |
| 5,143,458 A | * | 9/1992 | Alff et al. | 384/448 |
| 5,468,072 A | * | 11/1995 | Ekdahl et al. | 384/448 |
| 5,564,838 A | * | 10/1996 | Caillault et al. | 384/448 |
| 5,564,839 A | | 10/1996 | Ouchi et al. | 384/448 |
| 5,624,193 A | * | 4/1997 | Vogelsberger et al. | 384/517 |
| 5,668,426 A | | 9/1997 | Lamert et al. | 310/168 |
| 5,927,867 A | * | 7/1999 | Niebling et al. | 384/448 X |
| 6,007,253 A | * | 12/1999 | Rutter | 384/539 |
| 6,043,643 A | | 3/2000 | Message et al. | 324/207.25 X |

FOREIGN PATENT DOCUMENTS

| | | |
|---|---|---|
| EP | 0 665 436 A1 | 2/1995 |
| FR | 2754903 | 10/1996 |

* cited by examiner

*Primary Examiner*—Thomas R. Hannon
(74) *Attorney, Agent, or Firm*—Smith, Gambrell & Russell, LLP

(57) ABSTRACT

The present invention provides an instrumented rolling bearing device having an outer ring, an inner ring, at least one row of rolling bodies arranged between two raceways of the outer and inner rings, and an assembly for detecting rotation parameters, this assembly having a non-rotating sensor unit and a rotating encoder member. The device allows for angularly immobilizing a non-rotating part of the device on a support while at the same time allowing relative axial movement of the device with respect to the support.

20 Claims, 2 Drawing Sheets

INSTRUMENTED ROLLING BEARING

The present invention relates to the field of instrumented rolling bearings equipped with an assembly for detecting rotation parameters such as the angular position, the direction of rotation, the speed and the acceleration.

Such instrumented bearings and such set-ups are well known, particularly from document FR-A-2,754,903. These instrumented bearings may be used, for example, for controlling electric motors of the synchronous type.

The detection assembly consisting of a sensor unit and an encoder element therefore provides the motor control system with all the information it needs, particularly the rotational speed and the position of the poles of the rotor with respect to those of the stator.

In this type of instrumented bearing, the sensor is placed in a unit solid with the non-rotating ring of the bearing, while an encoder element is arranged on the rotating ring of the bearing or on a rotating part of the fixture and rotates past the sensitive part of the sensor so as, in collaboration therewith, to generate a signal that is representative of the rotation of the rotating element. The sensor-encoder assembly may, for example, be of the optical type, or may alternatively be of the magnetic type.

In synchronous motors, the rotor shaft is mounted to rotate in a casing which houses the stator, via at least two rolling bearings, one of which is axially immobilized with respect to the casing via its outer ring, while the outer ring of the other bearing can move axially over a limited distance with respect to the said casing.

The fixture generally comprises spring washers which apply, to the outer ring of the axially free bearing, an axial load which allows the two bearings to run without clearance and with a certain angle of contact that is oblique with respect to the axis of rotation of the bearing, by virtue of the axial preload applied.

In fixtures of the prior art, use is made of detection systems which are separate from the bearings, this being relatively bulky or expensive, or alternatively, use is made of an instrumented bearing placed at the end where the bearing is axially stationary with respect to the casing. Now, certain constraints, particularly those of size, geometry of the surrounding parts, risks of contamination, etc., do not always readily allow an instrumented bearing to be fitted at the end where the bearing is axially stationary in the casing.

There are therefore some technical applications—electric motors or the like—in which it would be advantageous to be able to fit an instrumented bearing capable of experiencing a limited axial movement within its housing. The structure of instrumented bearings of the prior art does not allow these to be adapted for mounting these with the outer ring of the bearing free to move axially in its housing.

The object of the invention is to overcome the above-mentioned drawbacks and to propose an instrumented rolling bearing capable of slight axial movement with respect to its non-rotating support.

The instrumented rolling bearing device according to the invention is of the type comprising an outer ring, an inner ring, at least one row of rolling bodies arranged between two raceways of the outer and inner rings, and an assembly for detecting rotation parameters, this assembly comprising a sensor unit solid with the non-rotating ring and a rotating encoder member. The device comprises means for both angularly immobilizing a non-rotating part of the device on a support and allowing relative axial movement of the device with respect to the support once the non-rotating part has been definitively mounted on the said support.

A rotating part of the device is solid with a shaft.

Advantageously, the sensor unit and the non-rotating ring are solidly attached.

The sensor unit may comprise the angular-immobilization means.

Advantageously, the angular-immobilization means also constitute means for angularly indexing the sensor unit with respect to the support.

Advantageously, the sensor unit comprises at least one cylindrical outer surface on which the angular-immobilization means are provided.

In one embodiment of the invention, the angular-immobilization means comprise a projection protruding radially from the cylindrical outer surface. The angular-immobilization means may comprise a recess formed between two projections protruding radially from the cylindrical outer surface, the said recess running axially.

The angular-immobilization means may also comprise a projection protruding axially from the sensor unit.

In another embodiment of the invention, the angular-immobilization means comprise a groove set into the cylindrical outer surface, the said groove running axially.

The encoder member may be of the optical or magnetic type.

Another subject of the present invention is the use of a device as described hereinabove. The non-rotating part of the device is mounted on a support provided with means that complement the angular-immobilization means so that the non-rotating part is angularly solid with the support and free to move axially with respect to the said support once the non-rotating part has been definitively mounted on the said support. The said complementing means may comprise an axial peg, a radial finger, or alternatively, a hole formed in the support.

Thus, the assembly formed by the bearing equipped with its sensor unit has a degree of axial freedom in two opposite directions with respect to the stationary support in or on which it is mounted. The unit also angularly immobilizes the non-rotating ring of the bearing with respect to the stationary support.

The device according to the invention therefore comprises means which are able simultaneously, not only while the non-rotating part is being mounted on its stationary support but also after it has been definitively mounted, to:
 angularly immobilize a non-rotating part of the device with respect to the stationary support;
 possibly angularly index the sensor unit with respect to the stationary support;
 provide the possibility of axial movement of the said device with respect to the said stationary support.

Thus, in the case of an instrumented rolling bearing mounted in a synchronous motor, precise angular indexing of the sensor with respect to an element of the casing whose angular position with respect to the stator is known, makes it possible, if the encoder is itself indexed with respect to the shaft and to the poles of the rotor, to ascertain the angular position of the rotor with respect to the stator and therefore the relative position of the poles. The sensor-encoder assembly may also deliver information relating to the speed and acceleration of the rotor. The possibility of axial movement of the instrumented rolling bearing is maintained after definitive mounting, which makes it possible to overcome any possible axial dimensional variations of certain components as a result, for example, of thermal expansions or of variations in the axial loading of the bearings.

Advantageously, these indexing means may also be used for locating the sensor unit connecting wires so that they lead out at a predetermined point.

The present invention will be better understood and other advantages will become apparent from reading the detailed description of a number of embodiments which are taken by way of non-limiting examples and illustrated by the appended drawings, in which.

Figure 1:
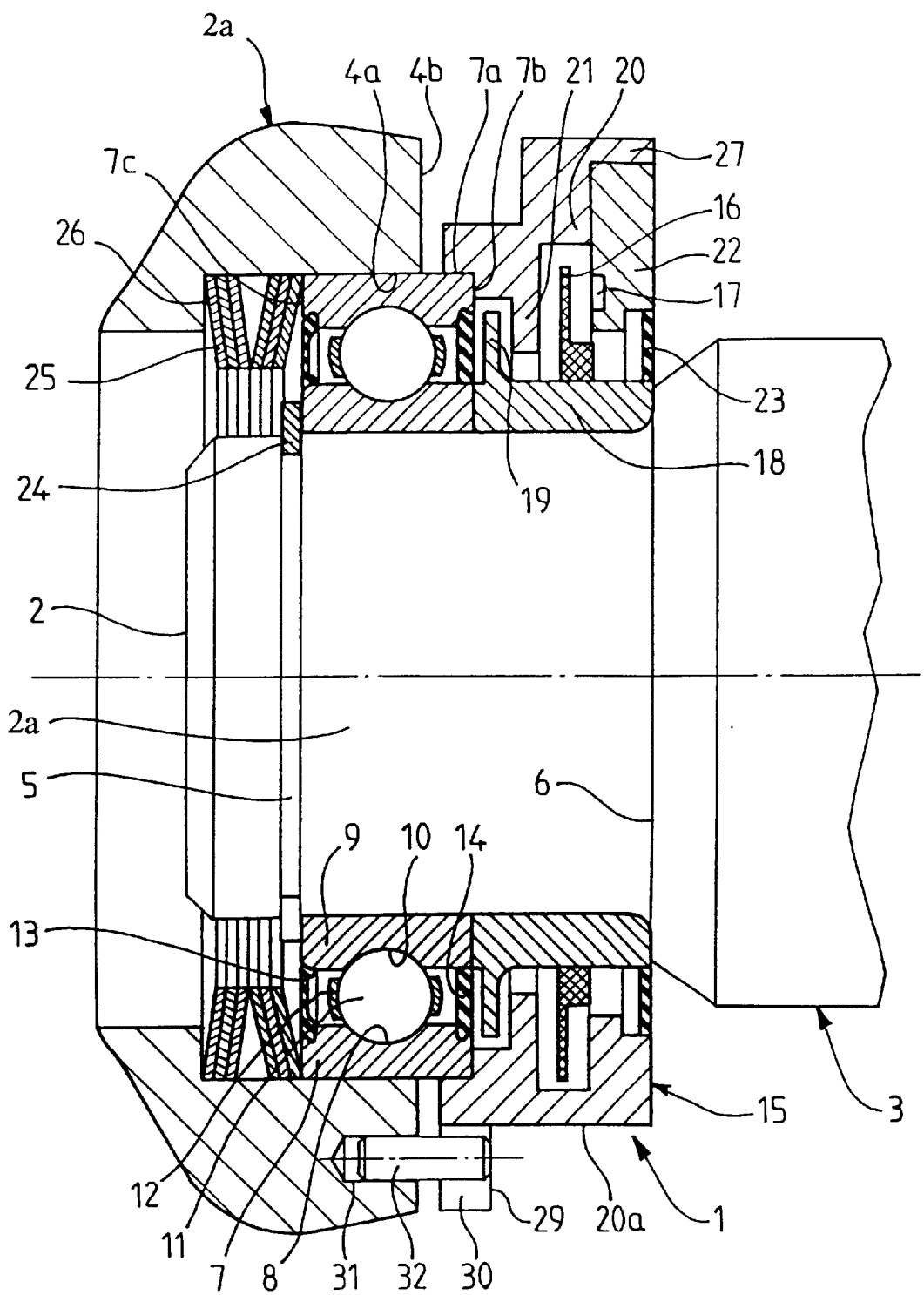
FIG. 1 is a view in axial section of an instrumented rolling bearing according to a first embodiment of the invention.
Figure 2:
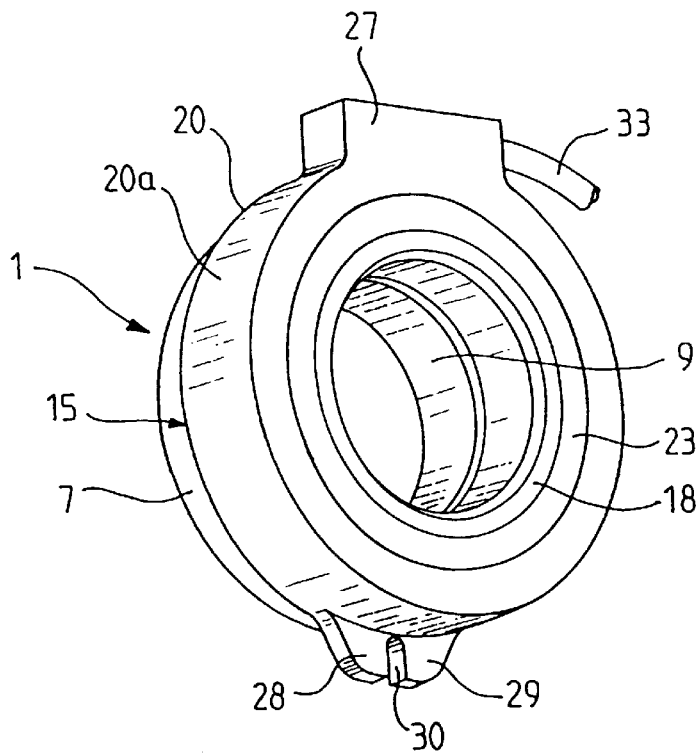
FIG. 2 is a perspective view of the rolling bearing of FIG. 1.

In FIG. 1, it may be seen that the instrumented rolling bearing, referenced 1 in its entirety, is mounted on the end 2 of a rotating shaft 3 of an electric motor. The shaft 3 supports the rotor, not depicted, and is mounted via the instrumented rolling bearing 1 so that it has axial float in a stationary casing 4 supporting the stator, not depicted. The end 2 of the shaft 3 comprises an outer cylindrical surface 2a bounded at the free end by an annular groove 5 with radial edges and at the opposite end by a radial surface 6 extending outwards.

The bearing 1 comprises an outer ring 7, equipped with a raceway 8, an inner ring 9, equipped with a raceway 10, a row of rolling bodies 11, in this instance balls, arranged between the raceways 8 and 10, a cage 12 which maintains the circumferential spacing of the rolling bodies 11, and two seals 13 and 14, mounted one on each side of the row of rolling bodies 11. The inner ring 9 is mounted on the cylindrical surface 2a near the groove 5. The outer ring 7 is mounted in a bore 4a of the casing 4 with a fit of the "close sliding fit" type.

The detection assembly associated with the bearing 1 carries the reference 15 and is made up of an encoder 16 and of a sensor 17 which are arranged in proximity to one another, with an axial gap between them.

The encoder 16 is in the form of a wheel which has optical graduations travelling past the sensor 17 which is supported by an annular element 18 in contact with the cylindrical surface 2a and arranged axially between the inner ring 9 and the radial surface 6 of the shaft 3. The encoder 16 is mounted approximately at the middle of the element 18, in the axial direction. The element 18, which is of cylindrical overall shape, comprises a radial flange 19 extending outwards near the bearing seal 14. The flange 19 is extended as far as the outer ring 7.

The sensor 17 is supported by a sensor unit 20 secured solidly to the outer ring 7. The sensor unit 20 comes into contact with part of the outer surface 7a of the outer ring 7 and with part of the front surface 7b of the outer ring 7 near the seal 14. The sensor unit is attached using an appropriate means such as push-fitting, bonding, welding, etc.

The sensor unit 20 is equipped with a radial flange 21 which extends radially inwards towards the element 18 supporting the encoder 16. The flange 21 is arranged axially between the flange 19 of the element 18 and the encoder 16. The flanges 19 and 21 form a labyrinth seal which blocks the propagation of contaminants such as the bearing grease, which would be harmful to the correct operation of the encoder 16 and of the sensor 17.

The radial flanges 19 and 21 belonging to the element 18 and to the sensor unit 20, respectively, also hold the said element 18 in place with respect to the sensor unit 20 before the rolling bearing 1 has been definitively mounted on the shaft 3 and axially secured.

The sensor 17 is mounted on a radial support element 22 fixed into the sensor unit 20 and extending inwards and axially between the encoder 16 and the radial surface 6 of the shaft 3, the sensor 17 being mounted facing the encoder 16. The support element 22 and the sensor unit 20 also support a seal 23 which rubs against the outer cylindrical surface of the element 18 supporting the encoder 16 near the radial surface 6 of the shaft 3 so as to prevent the ingress of external elements in the immediate vicinity of the encoder 16 and of the sensor 17.

To axially retain the various elements of which the instrumented rolling bearing 1 is made, a circlip 24 is arranged in the groove 5 at the end 2 of the shaft 3. The circlip 24 is in contact with the inner ring 9. The element 18 is held axially between the inner ring 9 and the radial surface 6 of the shaft 3. What is more, preload washers, referenced 25 in their entirety, of frustoconical shape, are arranged around the end 2 between a radial surface 7c of the outer ring 7 on the opposite side to the sensor unit 20 and a radial shoulder 26 of the casing 4. These preload washers 25 tend to separate the outer ring 7 and the shoulder 26. The outer ring 7 is mounted in its housing 4a with an interference-free fit of the close sliding fit type which gives it the possibility to move axially with respect to the casing.

As the other rolling bearing, not depicted, is axially connected to the casing, at least in the direction of the force exerted by the preload washers, the action of the said washers on the outer ring 7 of the first bearing causes a slight axial movement of the said outer ring and of the shaft until the axial play between the two bearings has been completely absorbed.

The outer surface 20a of the sensor unit 20 is of cylindrical overall shape with a radial protrusion 27 near the sensor 17 and allows the electric wires 33 from the sensor 17 to be led out and, possibly, means for orientating these wires or connection means, not depicted.

The outer surface 20a also has two protrusions 28 and 29 circumferentially separated by a recess 30. These protrusions 28 and 29 are arranged axially away from the radial surface 6 of the shaft 3, opposite a radial frontal surface 4b of the casing 4. The frontal surface 4b has an axial hole 31 in which is fitted a peg 32 which projects from the frontal surface 4b and engages in the recess 30 between the protrusions 28 and 29. The sensor unit 20 is thus angularly coupled to the casing 4 while retaining the possibility of axial movement, by virtue of the possibility of sliding of the axial peg 32 relative to the recess 30. Angular immobilization of the sensor unit 20 leads to that of the outer ring 7 which is also able to slide axially with respect to the bore 4a of the casing 4.

Thus, the peg 32 and the recess 30 are capable not only of angularly immobilizing the sensor unit with the casing, but can also act as a means of indexing the sensor with respect to a reference element of the casing. If the encoder is itself indexed with respect to a reference element of the rotor, it is possible at any moment to ascertain the angular position of the reference element of the rotor with respect to the reference element of the casing and to deduce from this, for example, the relative angular position of the poles of the rotor with respect to those of the stator. Angular indexing is also used to position the sensor unit connecting wires so that they are led out at a predetermined point.

Figure 3:
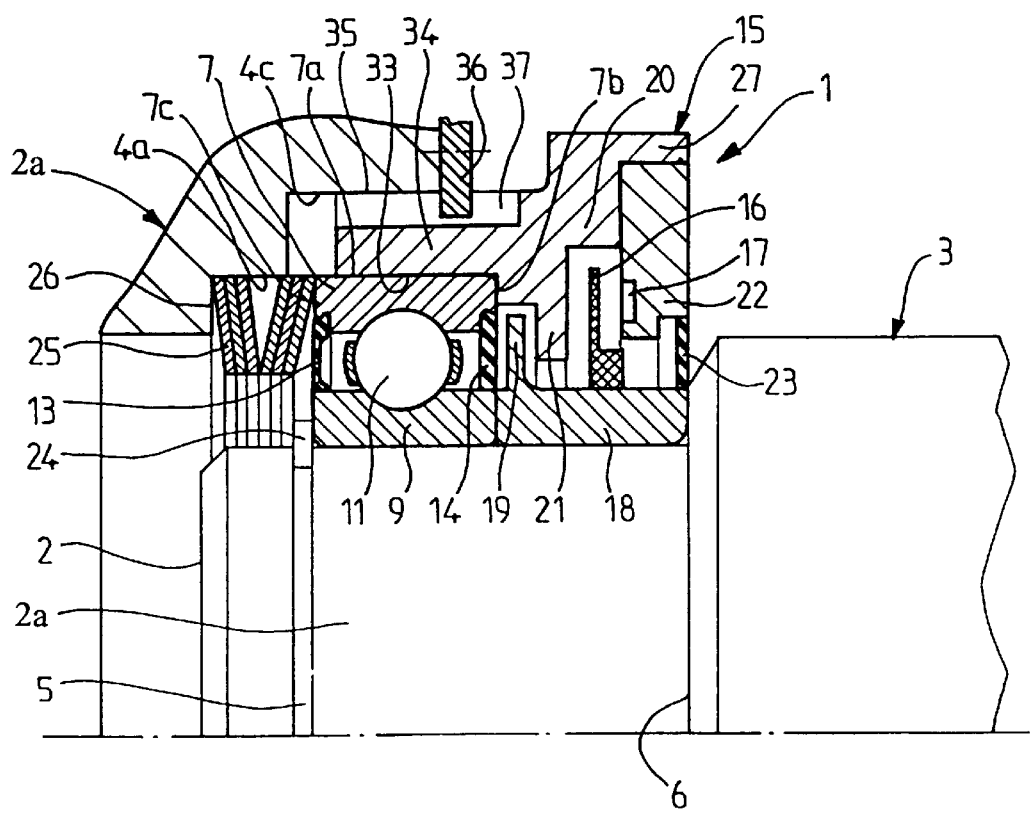
FIG. 3 is a view in axial section of an instrumented rolling bearing according to a second embodiment of the invention.

The embodiment illustrated in FIG. 3 differs from that illustrated in FIG. 1 in that the outer ring 7 of the bearing is entirely supported by a bore 33 of an axial extension 34 of the sensor unit 20. The axial extension 34 is also provided with a cylindrical outer surface 35, which is arranged in a corresponding bore 4c of the casing 4, the bore 4c having a larger diameter than the bore 4a in which the preload washers 25 are housed. The axial extension 34 forms a sleeve between the bore 35 and the outer surface 7a.

A stud 36 solid with the casing 4 projects radially inwards and collaborates with an axial groove 37 formed in the cylindrical outer surface 35 of the axial extension 34 of the sensor unit 20. The sensor unit 20 is thus mounted with the possibility of sliding axially with respect to the casing 4, any angular movement being prevented by the collaboration of the stud 36 and the groove 37. The outer ring 7 is axially and angularly solid with the sensor unit 20. The rotating inner ring 9 and the element 18 are solid in terms of rotation with the shaft 3 and are axially solid with the outer ring 7 and with the sensor unit 20. The stud 36 and the groove 37 further constitute means for angularly indexing the sensor with respect to the stationary support.

As an alternative, it would of course be possible to swap the aforementioned means and, for example, fit the sensor unit with an axial peg engaging in an axial hole made in the support or, alternatively still, fit the sensor unit with a peg or with a radial finger which engages in an axial groove formed in the support.

It is also possible to envisage a similar device, which operates using a magnetic detection system rather than an optical detection system.

In the aforementioned examples, the sensor is mounted on the outer ring of the bearing.

It would be possible, without departing from the scope of the invention, to have an instrumented rolling bearing in which the stationary ring was the inner ring and the rotating ring was the outer ring.

It would also be possible to replace the annular encoder support with an axial extension of the rotating ring of the bearing.

According to the invention, neither the peg 32, nor the stud 36, nor, more generally, the means for angularly immobilizing the non-rotating part of the device prevents the rolling bearing from enjoying axial mobility in terms of translation with respect to the support, thus allowing the use of an instrumented rolling bearing in places where the instrumented rolling-bearing devices of the prior art cannot be used.

What is claimed is:

1. Instrumented rolling bearing device comprising an outer ring, an inner ring, at least one row of rolling bodies arranged between a raceway of the outer ring and a raceway of the inner ring, and an assembly for detecting rotation parameters, this assembly comprising a sensor unit solid with the non-rotating ring and a rotating encoder member, the device further comprising means for both angularly immobilizing a non-rotating pair of the device on a support and allowing relative axial movement of the device with respect to the support once the non-rotating part has been definitively mounted on the said support.

2. Device according to claim 1, characterized in that the immobilizing means also constitute means for angularly indexing the sensor unit with respect to the support.

3. Device according to claim 1, characterized in that the sensor unit comprises the angular-immobilization means.

4. Device according to claim 1, characterized in the sensor unit comprises at least one cylindrical outer surface on which the angular-immobilization means are provided.

5. Device according to claim 4, characterized in that the angular-immobilization means comprise a projection protruding radially from the cylindrical outer surface.

6. Device according to claim 5, characterized in that the angular-immobilization means comprise a recess formed between two projections protruding radially from the cylindrical outer surface, the said recess running axially.

7. Device according to claim 4, characterized in that the angular-immobilization means comprise a groove set into the cylindrical outer surface, the said groove running axially.

8. Device according to claim 1, characterized in that the angular-immobilization means comprise a projection protruding axially from the sensor unit.

9. Device according to claim 1, characterized in that the encoder member is an optical encoder member.

10. Device according to claim 1, characterized in that the encoder member is a magnetic encoder member.

11. Use of a device according to claim 1, characterized in that the non-rotating part of the device is mounted on a support provided with means that complement the angular-immobilization means so that the non-rotating part is angularly solid with the support and free to move axially with respect to the said support.

12. Use according to claim 11, characterized in that the said complementing means comprise an axial peg or a radial finger.

13. Use according to claim 11, characterized in that the said complementing means comprise a hole formed in the support.

14. Use according to claim 11, characterized in that the said complementing means comprise an axial groove formed in the support.

15. An instrumented rolling bearing device, comprising:
    an outer ring with a raceway;
    an inner ring with a raceway;
    at least one row of rolling bodies arranged between the raceway of the outer ring and the raceway of the inner ring, and one of said rings being fixed in position relative to an opposing one of said rings;
    a sensor unit solid with the fixed ring;
    an encoder member supported by said device so as to rotate relative to said sensor unit; and
    means for both angularly immobilizing said sensor unit of the device support and allowing relative axial movement of said sensor unit with respect to a device mount support once the device has been definitely mounted on the mount support.

16. Device according to claim 15 wherein said sensor unit includes a recess which receives therein a fixing element of said angular-immobilization means.

17. Device according to claim 16 wherein said fixing element is a peg that extends into said recess and is supported by the mount support.

18. Device according to claim 15 wherein said sensor unit includes an axial extension fixed to said fixed ring and a radial support element fixed to said axial extension, and said sensor unit further comprising a sensor supported by said radial support element.

19. Device according to claim 18 wherein said angular-immobilization means includes a stud and said axial extension includes a groove which receives said stud member is axial slideable fashion.

20. Device according to claim 18 wherein said angular-immobilization means a pin and a radial projection extending from the axial extension, and said radial projection defines a reception area for receiving said pin which is supported in fixed position by the mount support.

\* \* \* \* \*